(12) United States Patent
Seydell et al.

(10) Patent No.: US 9,004,045 B2
(45) Date of Patent: Apr. 14, 2015

(54) TANK VENTILATION AND COOLING SYSTEM FOR HYBRID VEHICLES

(75) Inventors: Joachim Seydell, Gifhorn (DE);
Markus Seemayer, Isernhagen (DE);
Frank Stegemann, Ribbesbuettel (DE);
Olaf Magnor, Braunschweig (DE);
Daniel Beese, Braunschweig (DE);
Daniel Reitebuch, Berlin (DE);
Matthias Schultalbers, Meinersen (DE)

(73) Assignee: Iav GmbH Ingenieurgesellschaft Auto und Verkehr, Berlin (DE)

( * ) Notice: Subject to any disclaimer, the term of this patent is extended or adjusted under 35 U.S.C. 154(b) by 43 days.

(21) Appl. No.: 14/003,010

(22) PCT Filed: Feb. 27, 2012

(86) PCT No.: PCT/DE2012/000174
§ 371 (c)(1),
(2), (4) Date: Sep. 4, 2013

(87) PCT Pub. No.: WO2012/119577
PCT Pub. Date: Sep. 13, 2012

(65) Prior Publication Data
US 2013/0340725 A1 Dec. 26, 2013

(30) Foreign Application Priority Data
Mar. 4, 2011 (DE) .......................... 10 2011 013 005

(51) Int. Cl.
| | | |
|---|---|---|
| F02M 31/20 | (2006.01) | |
| F02M 33/02 | (2006.01) | |
| B60H 1/32 | (2006.01) | |
| B60K 15/035 | (2006.01) | |
| F01N 5/02 | (2006.01) | |
| B60K 15/03 | (2006.01) | |

(52) U.S. Cl.
CPC .............. *F02M 31/20* (2013.01); *B60H 1/3201* (2013.01); *B60K 15/035* (2013.01); *B60K 2015/03414* (2013.01); *F01N 5/02* (2013.01); *Y02T 10/16* (2013.01)

(58) Field of Classification Search
USPC .................................................. 123/541, 563
See application file for complete search history.

(56) References Cited

U.S. PATENT DOCUMENTS

| | | | | |
|---|---|---|---|---|
| 4,938,036 A | * | 7/1990 | Hodgkins et al. | 62/323.1 |
| 5,156,134 A | * | 10/1992 | Tochizawa | 123/541 |
| 5,251,603 A | * | 10/1993 | Watanabe et al. | 123/541 |
| 2007/0234715 A1 | * | 10/2007 | Willi et al. | 60/320 |

FOREIGN PATENT DOCUMENTS

| | | |
|---|---|---|
| DE | 2756348 A1 | 6/1979 |
| DE | 3214874 A1 | 11/1983 |
| DE | 19629165 C1 | 10/1997 |
| DE | 102007051469 A1 | 4/2009 |
| DE | 102008047721 A1 | 3/2010 |
| GB | 2246988 A | 2/1992 |

* cited by examiner

*Primary Examiner* — M. McMahon
(74) *Attorney, Agent, or Firm* — Leydig, Voit & Mayer, Ltd.

(57) ABSTRACT

A deaeration and cooling system for a fuel tank of an internal combustion engine includes an absorption refrigerator configured to cool fuel in the fuel tank. The absorption refrigerator includes a burner, an evaporator and an exhaust-gas heat exchanger. Thermal energy for operating the absorption refrigerator is obtained from the combustion of evaporated fuel. The evaporated fuel is removed from the fuel tank and supplied to the burner of the absorption refrigerator.

8 Claims, 1 Drawing Sheet

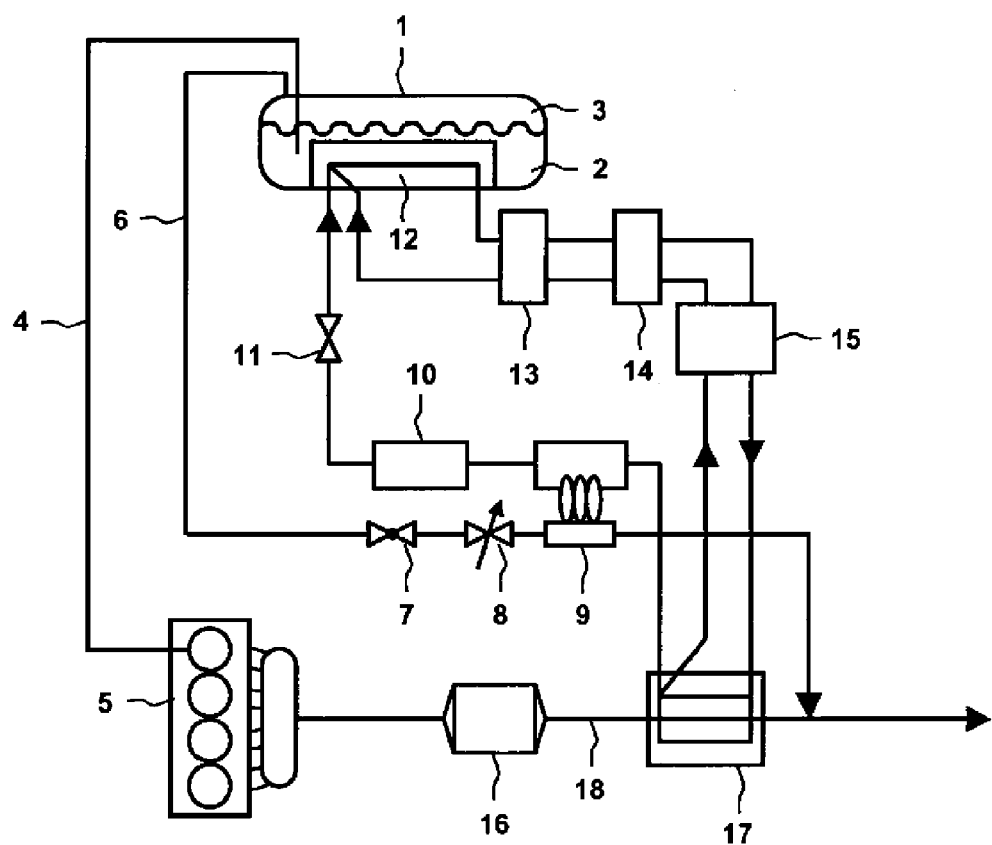

TANK VENTILATION AND COOLING SYSTEM FOR HYBRID VEHICLES

CROSS REFERENCE TO RELATED APPLICATIONS

This application is a U.S. National Phase application under 35 U.S.C. §371 of International Application No. PCT/DE2012/000174, filed on Feb. 27, 2012, and claims benefit to German Patent Application No. 10 2011 013 005.5, filed on Mar. 4, 2011. The International Application was published in German on Sep. 13, 2012 as WO 2012/119577 A1 under PCT Article 21 (2).

FIELD

The present invention relates to a fuel tank for motor vehicles. The device according to the invention comprises a deaeration and cooling system for the fuel tank and is particularly suitable for use in hybrid vehicles, in particular for what are known as plug-in hybrid vehicles.

BACKGROUND

Motor vehicles which are equipped with an internal combustion engine comprise fuel tanks which store fuel required for the operation of the internal combustion engine. For internal combustion engines which operate according to the four-stroke principle, petrol is accordingly stored in the fuel tank. Conventional liquid petrol consists of a mixture of various hydrocarbons, of which the evaporation temperatures are in the range of normal ambient temperatures or lower temperatures. Therefore, a proportion of the fuel is evaporated when liquid petrol is stored in the fuel tank. In addition to the liquid petrol, there is therefore also an evaporated, gaseous fuel in the fuel tank. This effect occurs with all fuels which display a tendency to evaporate under the normal operating conditions of the engine. The on-going evaporation of the liquid fuel at corresponding temperatures leads to pressure increases in the fuel tank, which is counteracted by various means. According to current emission regulations, compliance with which is determined by the mandatory SHED test, these gaseous hydrocarbons must, however, be prevented from entering the environment and thereby causing damage to health and the environment. In order to prevent high component costs, the fuel tank is not configured as a pressure vessel, but rather is only dimensioned up to a relative pressure difference of approximately +/−50 mbar. In order to prevent pressure loads, pressure-equalising systems are used. For this, in conventional motor vehicles, in addition to tank-aeration systems, tank-deaeration systems are also provided, in which the gaseous fuel is conducted out of the fuel tank, and an increase in pressure is thus prevented. The fuel which is conducted out is then stored temporarily in, for example, an activated carbon canister and, during the operation of the internal combustion engines, is fed into the combustion via corresponding connections, devices and control systems. According to the storage capacity of these activated carbon canisters, certain flushing cycles are required in which the fuel stored in the activated carbon canister is flushed out. The flushing can either take place passively, at certain operating points of the internal combustion engine, or actively, by using additional pumps. If the activated carbon canister cannot be flushed because the motor vehicle for example is stationary for a relatively long time, the maximum intake capacity is reached. The filter effect of the activated carbon filter is lost, and evaporated fuel is released into the environment. This is generally known as breaking through the activated carbon filter. Alternatively, systems are also known which liquefy the gaseous fuel which is conducted out using cooling systems and feed the condensed fuel back into the fuel tank. The effect of the tank-deaeration system is shown especially during the heating of the petrol due to high ambient temperatures, due to waste heat during the operation of the internal combustion engine, and due to mechanical losses in the fuel supply, such as in the fuel pump for example. Emissions which occur due to the motor vehicle being stationary for long periods of time or when refuelling can also be prevented.

If, however, further drive units such as electromotive drives are provided in addition to the internal combustion engine, the flushing cycles change. If the electromotive drive is used more frequently or is given priority during the operation of the motor vehicle, fewer cycles for flushing the activated carbon canister are available. If the internal combustion engine is only used as an ancillary unit, in order for example to increase the operating range of the motor vehicle, it must be constantly ensured that said engine is ready for use, and a sufficient quantity of fuel must be carried. In that case, the problem is exacerbated further, since operation of the internal combustion engine is only required in exceptional cases. The internal combustion engine is then only operated at optimal-efficiency operating points at which the conventional tank deaeration cannot work. However, emissions which occur due to evaporated fuel must also be prevented in this case. The fuel tank can be configured as a pressure vessel, but this has proven to be disadvantageous in terms of component costs, component weight and also, as a result of the high vessel pressure, in terms of refuelling. Conventional systems with temporary storage and subsequent feeding to the combustion in internal combustion engines are not suitable therefor. In addition, the laid-open application DE 10 2008 047 721 A1, for example, discloses systems which temporarily store the gaseous hydrocarbons in a reserve tank which is designed as a pressure vessel. The laid-open application DE 10 2007 051 469 A1 discloses a fuel tank comprising a deaeration line having a condensation means, wherein the condenser cools and thus liquefies the gaseous fuel. As a result, it is possible to conduct the liquefied fuel back into the fuel tank. The condenser is operated using a coolant from an absorption or compression refrigeration system.

The laid-open application DE 27 56 348 A1 discloses an absorption refrigeration system by means of which the temperature in a passenger compartment and payload space of a motor vehicle is controlled. In an advantageous configuration, the fuel is additionally cooled by means of a fuel cooler. In this case, the absorption refrigeration system is powered by waste-heat-generating drive units of the motor vehicle. The waste heat from the internal combustion engine itself and the waste heat from the oil from gears or retarders are disclosed as heat sources.

DE 32 14 874 C2 discloses a device for cooling fuel in the fuel tank. In this case, a heat exchanger serving as an evaporator or a heat exchanger which is connected downstream of an evaporator is installed in the fuel tank.

Cooling, liquefying and storage systems which are integrated in the fuel tank or in fuel return lines and operate using electrical energy or draw energy from the operation of an internal combustion engine are also unsuitable in view of the optimisation of the operating range of electric and hybrid vehicles.

SUMMARY

In an embodiment, the present invention provides a deaeration and cooling system for a fuel tank of an internal combustion engine including an absorption refrigerator configured to cool fuel in the fuel tank. The absorption refrigerator includes a burner, an evaporator and an exhaust-gas heat exchanger. Thermal energy for operating the absorption refrigerator is obtained from the combustion of evaporated fuel. The evaporated fuel is removed from the fuel tank and supplied to the burner of the absorption refrigerator.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a schematic view of a deaeration and cooling system for a fuel tank for use in hybrid vehicles.

DETAILED DESCRIPTION

In an embodiment, the present invention provides a pressure-equalising system for a fuel tank of a hybrid vehicle.

In an embodiment, the advantageous invention provides a deaeration and cooling system for a fuel tank for use in hybrid vehicles which cools the fuel in a particularly advantageous way in order to prevent evaporation of fuel. An absorption refrigerator is proposed for this purpose, of which the thermal energy for operating the system is obtained from the exhaust-gas heat of an internal combustion engine or from the combustion of fuel vapour which is conducted out of the fuel tank. By conducting the evaporated fuel and cooling the liquid fuel, the pressure load in the fuel tank and thus the risk of hydrocarbon emissions are minimised.

By conducting away and removing evaporated, gaseous petrol, the proposed device lowers the gas pressure in the fuel tank in such a way that the pressure is released. The gaseous petrol which is then combusted in a burner to supply energy for the absorption refrigerator does not appear to be disadvantageous either in terms of the SHED test or in terms of odour formation, since ideally, it burns to carbon dioxide and water. The gaseous petrol released in a conventional system, or else released into the environment via the saturated activated carbon filter or via an emergency valve, is used in a useful manner by the proposed device, in that the energy bound thereto is used to cool the liquid petrol in the fuel tank. The thermal energy of the internal combustion engine, which energy is released in a conventional system or else released into the environment, is used in a useful manner in part in that for example the exhaust-gas energy is used to cool the liquid petrol in the fuel tank. By lowering the temperature of the liquid petrol, the tendency of the liquid petrol in the fuel tank to evaporate is reduced.

The proposed advantageous device additionally operates in a pre-emptive and self-stabilising manner, in that the waste heat of the exhaust gas which is released during the operation of the internal combustion engine or other waste heat is used to cool the liquid petrol in the fuel tank. When the internal combustion engine is in the stopped condition, the fuel is only cooled as long as excess pressure to be released is present in the fuel tank. The problem of the evaporating fuel is reduced overall thereby. An additional advantage of the device according to the invention is that this design is lighter and more cost-effective by comparison with the use of a pressure tank.

By comparison with a method using compression in a pressure vessel, the new device manages without electrical energy, without moving parts, and without noise generation.

In addition, a method for operating the deaeration and cooling system according to the invention is proposed in which the source of the thermal energy for operating the absorption refrigerator is selected on the basis of the operating state of the internal combustion engine. Thus, when the internal combustion engine is in the stopped condition, thermal energy is only available as a result of the combustion of the gaseous fuel. During the operation of the internal combustion engine, thermal energy from the waste heat of the internal combustion engine can also be used. Accordingly, when the internal combustion engine is in the stopped condition, the combustion of gaseous fuel from the fuel tank is selected, and during the operation of the internal combustion engine, the waste heat of the internal combustion engine is also used. In an advantageous configuration of the method, the waste heat can preferably be used and the combustion of the gaseous fuel can be dispensed with.

The device contains a fuel tank (1), in which a liquid fuel (2) with a tendency to evaporate, for example petrol, is located. In addition, the fuel tank (1) contains gaseous fuel (3) which results from the evaporation of part of the liquid fuel. A fuel supply line (4) to an internal combustion engine (5) is provided to supply fuel. In addition, a removal line (6) is provided, by means of which the gaseous fuel (3) is removed from the fuel tank (1) and is supplied to a burner (9) via a pressure controller (7) and a metering valve (8). The supply of fuel vapour to the burner (9), can be connected and disconnected by means of the metering valve (8), for example via the engine control unit of the vehicle. The pressure controller is used to restrict the pressure of the fuel before it is supplied to the burner (9).

The burner (9) heats a still-liquid refrigerant, for example ammonia, until it evaporates and thereby builds a gas pressure. In a condenser (10) which is connected downstream, the refrigerant condenses whilst emitting heat. A throttle (11) reduces the pressure, as a result of which the boiling temperature of the refrigerant decreases, and said refrigerant can evaporate in the evaporator (12). The heat required for the evaporation is taken from the liquid fuel from the fuel tank (1), as a result of which the fuel cools down. The evaporation is facilitated by an auxiliary medium, for example helium, in that said medium equalises the pressure. For this purpose, the auxiliary medium is first brought to a lower temperature level by a gas heat exchanger (13) in favour of a better level of efficiency. The evaporation would come to a standstill if the saturated vapour pressure were reached in the evaporator (12). Therefore, the refrigerant is absorbed in an absorber (14) of an absorption medium, for example water. The circulation of the absorption medium is maintained by the energy supplied in the burner (9), wherein the temperature level of the absorbent is raised in a heat exchanger (15). Energy is supplied for the absorption refrigerator not only via the burner (9), but also via an exhaust-gas heat exchanger (17) positioned downstream of a catalytic converter (16), which heat exchanger transports heat from the exhaust-gas system (18) of the internal combustion engine (5) into the refrigeration system.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Fuel tank
2 Liquid fuel
3 Gaseous fuel
4 Fuel supply line
5 Internal combustion engine
6 Removal line
7 Pressure controller
8 Metering valve
9 Burner
10 Condenser
11 Throttle
12 Evaporator
13 Gas heat exchanger
14 Absorber
15 Heat exchanger
16 Catalytic converter
17 Exhaust-gas heat exchanger
18 Exhaust-gas system

The invention claimed is:

1. A deaeration and cooling system for a fuel tank of an internal combustion engine, the deaeration and cooling system comprising:

an absorption refrigerator configured to cool fuel in the fuel tank, the absorption refrigerator comprising a burner, an evaporator and an exhaust-gas heat exchanger, wherein thermal energy for operating the absorption refrigerator is obtained from the combustion of evaporated fuel, the evaporated fuel being removed from the fuel tank and supplied to the burner of the absorption refrigerator.

2. The deaeration and cooling system for a fuel tank according to claim 1, wherein thermal energy for operating the absorption refrigerator is also obtained from the waste heat of the internal combustion engine.

3. The deaeration and cooling system for a fuel tank according to claim 1, wherein the evaporator of the absorption refrigerator is arranged inside the fuel tank.

4. The deaeration and cooling system for a fuel tank according to claim 2, wherein the evaporator of the absorption refrigerator is arranged inside the fuel tank.

5. The deaeration and cooling system for a fuel tank according to claim 1, wherein the exhaust-gas heat exchanger of the absorption refrigerator is arranged on an exhaust-gas system of the internal combustion engine.

6. The deaeration and cooling system for a fuel tank according to claim 2, wherein the exhaust-gas heat exchanger of the absorption refrigerator is arranged on an exhaust-gas system of the internal combustion engine.

7. The deaeration and cooling system for a fuel tank according to claim 3, wherein the exhaust-gas heat exchanger of the absorption refrigerator is arranged on an exhaust-gas system of the internal combustion engine.

8. A method for operating a deaeration and cooling system, the method comprising:

providing an absorption refrigerator for cooling fuel in a fuel tank, the absorption refrigerator comprising a burner, an evaporator and an exhaust-gas heat exchanger; and selecting a source of thermal energy for the absorption refrigerator based on an state of an internal combustion engine, wherein the selecting includes selecting the use of thermal energy from the combustion of gaseous fuel when the internal combustion engine is in a stopped state, or selecting the use of thermal energy from waste heat of the internal combustion engine in addition to the use of thermal energy from the combustion of gaseous fuel during the operation of the internal combustion engine, with a preference of selecting the use of waste heat.

* * * * *